(12) United States Patent
Stronkhorst

(10) Patent No.: US 11,002,590 B2
(45) Date of Patent: May 11, 2021

(54) WEIGHING SYSTEM

(71) Applicant: Optimus Sorter Holding B.V., Beuningen (NL)

(72) Inventor: Willem Dagobert Stronkhorst, Beuningen (NL)

(73) Assignee: Optimus Sorter Holding B.V., Beuningen (NL)

( * ) Notice: Subject to any disclaimer, the term of this patent is extended or adjusted under 35 U.S.C. 154(b) by 190 days.

(21) Appl. No.: 16/252,272

(22) Filed: Jan. 18, 2019

(65) Prior Publication Data

US 2019/0219439 A1   Jul. 18, 2019

(30) Foreign Application Priority Data

Jan. 18, 2018  (NL) ...................................... 2020297

(51) Int. Cl.

| | |
|---|---|
| *B07C 5/18* | (2006.01) |
| *G01G 19/52* | (2006.01) |
| *G01G 11/00* | (2006.01) |
| *B65G 47/96* | (2006.01) |
| *B65G 17/34* | (2006.01) |
| *G01G 19/03* | (2006.01) |
| *G01G 11/04* | (2006.01) |

(52) U.S. Cl.
CPC .............. *G01G 19/52* (2013.01); *B07C 5/18* (2013.01); *B65G 17/34* (2013.01); *B65G 47/96* (2013.01); *B65G 47/965* (2013.01); *G01G 11/003* (2013.01); *G01G 11/04* (2013.01); *G01G 19/035* (2013.01)

(58) Field of Classification Search
CPC ........ B65G 17/48; B65G 17/38; B65G 17/42; B65G 47/965; B65G 17/34; B65G 47/96; B07C 5/18; G01G 19/52; G01G 11/04; G01G 11/03; G01G 19/035; G01G 11/003
See application file for complete search history.

(56) References Cited

U.S. PATENT DOCUMENTS

| | | | |
|---|---|---|---|
| 1,404,591 A |   | 1/1922 | Fredrickson |
| 2,625,830 A | * | 1/1953 | Transeau ................ F16G 13/07 198/853 |
| 3,454,614 A |   | 7/1969 | Tani et al. |
| 3,918,587 A |   | 11/1975 | Drew, Jr. |

(Continued)

FOREIGN PATENT DOCUMENTS

| | | | |
|---|---|---|---|
| EP | 0982570 A2 | 8/1999 | |
| EP | 1528017 A1 | * 5/2005 | ............. B65G 17/42 |

(Continued)

*Primary Examiner* — Patrick H Mackey
(74) *Attorney, Agent, or Firm* — Jeffrey D. Shewchuk; Shewchuk IP Services, LLC

(57) ABSTRACT

A weighing system weighs an item within a container on a conveyor. The container is connected to the conveyor via a primary connecting means and a secondary connecting means, each of which include a first section permanently connected to the container, a second section permanently connected to the conveyor, and a third section hingedly connected to both the first section and the second section. The third sections are mutually coupled to each other, and are each rotatable about a first axis substantially parallel to the conveying direction, such that the rotation allows for movement of the container with respect to the conveyor in a vertical direction.

17 Claims, 5 Drawing Sheets

(56) References Cited

U.S. PATENT DOCUMENTS

| | | | |
|---|---|---|---|
| 4,187,945 A | 2/1980 | Altenpohl et al. | |
| 4,957,619 A * | 9/1990 | Powell, Jr. | B07C 5/02 |
| | | | 198/443 |
| 5,306,877 A * | 4/1994 | Tas | B07C 5/18 |
| | | | 177/145 |
| 6,627,826 B2 * | 9/2003 | Cavina | B65B 43/52 |
| | | | 177/145 |
| 7,077,620 B2 * | 7/2006 | Ishioka | B65G 17/48 |
| | | | 198/468.6 |
| 7,658,273 B2 * | 2/2010 | Nakamura | B65G 17/48 |
| | | | 198/414 |
| 8,056,701 B2 * | 11/2011 | Sugimoto | B65G 35/06 |
| | | | 198/463.3 |
| 10,094,701 B2 * | 10/2018 | Blanc | G01G 13/22 |
| 2017/0073172 A1 | 3/2017 | Kuijpers et al. | |
| 2017/0305674 A1 | 10/2017 | de Bruijn | |

FOREIGN PATENT DOCUMENTS

| | | |
|---|---|---|
| EP | 1733897 B1 | 12/2006 |
| EP | 1972579 A1 | 9/2008 |
| EP | 3059561 A1 | 8/2016 |
| FR | 2849790 B1 | 5/2005 |
| NL | 2013604 B1 | 10/2016 |
| NZ | 541040 A | 3/2008 |
| WO | 9833046 A1 | 7/1998 |
| WO | 2016/133398 A1 | 8/2016 |
| WO | 2018016946 A1 | 1/2018 |

* cited by examiner

WEIGHING SYSTEM

FIELD OF THE INVENTION

The invention is in the field of weighing systems for weighing an item when being conveyed from a receiving section to an outlet section.

BACKGROUND OF THE INVENTION

Weighing systems for weighing an item when being conveyed from a receiving section to an outlet section are known in the art. For example, EP0568763 discloses a weighing system comprising a plurality of containers arranged for transporting the item. The containers are connected to a conveyor means arranged in the weighing system for conveying the containers in a conveying direction. The container is supported by the conveyor means in a first vertical position via a pin of the tray arranged in an recess of the conveyor means. The tray may be lifted to a second vertical position by further means, the lifting being guided by a movement of the pin along the opening defined by the recess. When the tray is in the second vertical position, said tray is supported by a weighing device to weigh the container comprising the item.

A problem of the above mentioned weighing system is that the tray is subjected to vibrations and/or movements when being conveyed in the second vertical position that may decrease the accuracy of the weighing process. It is an object of the present application to alleviate this problem.

SUMMARY OF THE INVENTION

The invention relates to a weighing system for weighing an item when being conveyed from a receiving section to an outlet section, the weighing system comprising:

at least one container for transporting the item;

a conveyor means connected to the container for conveying said container in a conveying direction at a first vertical position relative to the conveyor means; and a weighing device for weighing the container when said container is being conveyed and supported on said weighing device;

wherein the container is connected to the conveyor means via a primary connecting means and a secondary connecting means, each of the two connecting means comprising a first section permanently connected to the container, a second section permanently connected to the conveyor means, and a third section hingedly connected to both the first section and the second section;

wherein both connecting means are arranged such that the third section of the primary connecting means and the third section of the secondary connecting means are rotatable about a first axis substantially parallel to the conveying direction, such that the rotation of said third sections about the first axis allows for movement of the container with respect to the conveyor means in a vertical direction from the first vertical position to a second vertical position, and wherein the third section of the primary connecting means and the third section of the secondary connecting means are mutually coupled.

DETAILED DESCRIPTION OF THE INVENTION

The invention concerns a weighing system according to claim 1. In this way, the weighing system allows for a more accurate weighing of the container and, therefore, of the item transported by the container.

The weighing system according to the invention comprises a primary connecting means and a secondary connecting means for connecting the container to the conveyor means. The container may thus be conveyed in a conveying direction at a first vertical position relative to said conveyor means. The conveying direction defines an axis X.

Each of the connecting means comprises a first section permanently connected to the container, a second section permanently connected to the conveyor means and a third connection hingedly connected to both the first section and the second section, for example via flexure bearings. In this way, the third section of each of the connecting means is capable of rotating for allowing the container to move in a vertical direction along an axis Z from the first vertical position to a second vertical position, which is the position at which the container is weighed when being conveyed on the weighing device. In general, the axis Z is transverse to the conveying direction.

The third section of the primary and the secondary means are both capable of rotating about an axis parallel to the conveying direction for allowing movement of the container relative to the conveyor means. In this way, the container may move relative to the conveyor means from the first vertical position to a second vertical position. The second vertical position is the vertical position of the container relative to the conveyor means when being conveyed supported on the weighing device due to the load that said container and the item being transported by said container. Thus, the effect that the conveyor means may have when the container is weighed is negligible. Further, when the container moves from the first vertical position to the second vertical position is less subjected to vibrations, since the connecting means are not arranged for sliding but for rotating, even if the container moves along the axis Z due to the weight of the container, or called tray as well, when being weighed and the item when being conveyed on the weighing means.

It is preferred that both connecting means connect the container to a conveyor bar arranged in a conveyor chain of the conveyor means such that the bottom section of the container is easily available to be weighed by the weighing device during operation of the weighing system. The first section and the second section of a connecting means may be respectively connected to the top sections of the container and the conveyor bar or the bottom sections of said container and conveyor bar. Plus, the first section and the second section of the primary connecting means may be arranged in said top sections while the first section and the second section of the secondary means and vice versa. In general both connecting means are arranged at the bottom sections.

According to the invention, the primary connecting means and the secondary connecting means are arranged such that the first axis is substantially parallel to the axis X defined by the conveying direction. Additionally, the third section of the primary connecting means and the third section of the secondary connecting means are mutually coupled so as to cause a motion of the third section of the primary connecting means similar to a motion of the third section of the secondary connecting means. As such, the container may be moved from a first vertical position to a second vertical position being higher than the first vertical position either by translation along the axis Z or by tilting about the axis X.

Thus, the primary and the secondary connecting means cooperate to convey the container in a stable way, reducing movements of the container along an axis Y transverse to both the axis X and axis Z when said container is being conveyed at the second vertical position. The larger the distance in the conveying direction of the first sections connected to the container, the less movement of the container there is in said conveying direction. Further, the movement of the container along the axis X is also reduced when being conveyed in the second vertical position, while said container may still move in the Z direction.

In an embodiment, the primary connecting means and the secondary connecting means form identical linkages which are spaced apart at a distance so as to fit to the container between the front side and the rear side thereof when considering the conveying direction. In this way, the container being moved from the first vertical position to the second vertical position allows to be moved along the axis Z and about the axis X, while movements relative to the conveyor means along the axis X and Y are blocked and as well as movements about axis Y and Z. The degrees of freedom to move along the axis Z and to move about the axis X minimizes the interference of the conveyor means when weighing the container including the item supported by the container. In such arrangement, the primary connecting means may face a front side of the container when seen in the conveying direction and the secondary connecting means may face a rear side of the container when seen in the conveying direction so as to achieve the preferred distance. The larger the distance in the conveying direction of the first sections connected to the container, the less movement of the container there is in said conveying direction.

In an embodiment, a coupling element is arranged to interconnect the third section of the primary connecting means and the third section of the secondary connecting means. In this way, a motion of the third section of the primary connecting means is followed or substantially copied by the third section of the secondary connecting means and vice versa.

In an embodiment, the coupling element is a construction element which is torsionally rigid along an axis extending parallel to the conveying direction. In this way, the motion of the third section of the primary connecting means coupled with the motion of the third section of the secondary connecting means occurs or is followed or substantially copied by a higher accuracy so as to minimize interference caused by the conveyor means.

In an embodiment, the coupling element is an elongated construction element such as a bar or a pipe. In this way, it becomes possible to achieve a high level of accuracy of the weighing measurement based on construction material which is designed to provide torsional stiffness and strength.

In an embodiment, the coupling element is having a first end pointing forward in the conveying direction and a second end pointing backward in the conveying direction, the first end of which is permanently connected to the third section of the primary connecting means and the second end of which is permanently connected to the third section of the secondary connecting means so as the coupling element to extend between the identical linkages and to span the distance between the third sections. In this way, a torsional rigid connection between the identical linkages without having any interference with the space of the path wherein the container needs to be conveyed.

In an embodiment, the first end of the coupling element is welded to the third section of the primary connecting means and the second end of the coupling element is welded to the third section of the secondary connecting means. In this way, the mutual connection between the third section of the primary connecting means and the third section of the secondary connecting means is easy to manufacture to achieve the torsional stiffness required.

In an embodiment, the third section of the first connecting means is in a parallelepiped arrangement with respect to the third section of the secondary connecting means. In this way, a type of four-rod mechanism is obtained wherein the container being moved from the first vertical position to the second vertical position allows to be moved along the axis Z and about the axis X, while movements relative to the conveyor means along the axis X and Y are blocked and as well as movements about axis Y and Z. The degrees of freedom to move along the axis Z and to move about the axis X minimizes the interference of the conveyor means when weighing the container including the item supported by the container. In such arrangement, the primary connecting means may face a front side of the container when seen in the conveying direction and the secondary connecting means may face a rear side of the container when seen in the conveying direction so as to achieve the preferred distance. The larger the distance in the conveying direction of the first sections connected to the container, the less movement of the container there is in said conveying direction.

In an embodiment, the third section of the primary connecting means as well as the third section of the secondary connecting means are designed to allow a movement of the container between the first vertical position and the second vertical position and to transmit actuation of the conveyor means to the container in the conveying direction. In this way, it becomes possible to transfer power and movement from the conveyor bar arranged in a conveyor chain of the conveyor means to the container in way which requires a minimum of parts and material which is saving costs and which meets sustainability conditions.

In an embodiment, the container is, in addition, connected to the conveyor means via a tertiary connecting means comprising a first section permanently connected to the container, a second section permanently connected to the conveyor means, and a third section hingedly connected to both the first section and the second section of the tertiary connecting means; wherein the tertiary connecting means is arranged such that the third section of the tertiary connecting means is rotatable about a second axis transverse to the conveying direction such that the rotation of said third section about the second axis allows for movement of the container with respect to the conveyor means in a vertical direction from the first vertical position to a second vertical position. In this way, it becomes possible to transfer power and movement from the conveyor bar arranged in a conveyor chain of the conveyor means to the container in a way which allows a tensile force exerted by the conveyor means on the third section of the tertiary connecting means to apply to the container to be conveyed in the conveying direction. Since the power and movement from the conveyor bar arranged in a third section of the tertiary connecting means rather than the third section of the primary and the secondary connecting means, the third sections of these are spared and limited to the function of allowing the container to be moved between the first vertical position and the second vertical position causing a higher accuracy of the performance of the weighing device.

In an embodiment, the third section of the primary connecting means as well as the third section of the secondary connecting means are, seen in conveying direction, flexible so as to allow deformation along an axis parallel to the conveyance direction. In this way, both the third section of the primary connecting means as well as the third section of the secondary connecting means are unable to transfer power and movement from the conveyor bar arranged in a conveyor chain of the conveyor means to the container and so the third section of the tertiary connecting means takes over to transfer a tensile force exerted by the conveyor means on the third section of the tertiary connecting means to the container to be conveyed in the conveying direction. The function of the third section of the primary and the secondary connecting means is limited to allowing the container to be moved between the first vertical position and the second vertical position causing a higher accuracy of the performance of the weighing device.

In an embodiment, a lifting device is arranged comprising a frame, the frame comprising a receiving area adjacent to the weighing device, said receiving area configured, when the container is being conveyed, for
i) receiving the container in the first vertical position and;
ii) guiding the container upwardly towards the second vertical position by means of a first guide rail to be impinged by a first roller fixed to the bottom of the container at a position between the primary connecting means and the secondary connecting means, preferably in the middle between the front side of the container when seen in the conveying direction and the rear side of the container when seen in the conveying direction. In this way, it becomes possible to cause the container to move it from the first vertical position to the second vertical position, the container conveyed supported by the first guide rail in which first guide rail a load cell is arranged for measuring the load of the container including its item, whereas the container was, before entering the lifting device, resting on a resting portion arranged at a corresponding conveyor bar arranged in a conveyor chain of the conveyor means.

In an embodiment, the receiving area is further configured, when the container is being conveyed, for guiding the container for upward translation towards the second vertical position by means of a second guide rail to be impinged by a second roller fixed to the bottom of the container at a position facing away the conveyor means, preferably in the middle between the front side of the container when seen in the conveying direction and the rear side of the container when seen in the conveying direction. In this way, it becomes possible to cause the container to move it from the first vertical position to the second vertical position, the container conveyed supported by the first and the second guide rail in which both first and second guide rail a load cell is arranged for measuring the load of the container including its item. Before the container was entering the lifting device, it was at the conveyor means side partly resting on a resting portion arranged at a corresponding conveyor bar arranged in a conveyor chain of the conveyor means, and, at an opposing side, partly resting on a further guide rail which is to be followed by the container to follow the path of the conveyor device. Since, in the weighing area both the first guide rail and the second guide rail support and lift the container conveyed according to a similar vertical distance, the container may be level which is advantageously since the item resting on the container may not be moved due to a tilting surface.

In an embodiment, the receiving area is further configured, when the container is being conveyed, for guiding the container for upward tilting along an axis parallel to the conveying direction, wherein tilting is caused by means of a third guide rail which is flush and aligned with a rail before the container entered the receiving area, the third guide rail to be followed by a third roller fixed to the bottom of the container at a position facing away the conveyor means, preferably in the middle between the front side of the container when seen in the conveying direction and the rear side of the container when seen in the conveying direction. In this way, it becomes possible to cause the container to move it from the first vertical position to the second vertical position, the container conveyed supported by the first and the second guide rail in which both first and second guide rail a load cell is arranged for measuring the load of the container including its item. Before the container was entering the lifting device, it was at the conveyor means side partly resting on a resting portion arranged at a corresponding conveyor bar arranged in a conveyor chain of the conveyor means, and, at an opposing side, partly resting on a further guide rail which is to be followed by the container to follow the path of the conveyor device. Since, in the weighing area both the first guide rail and the second guide rail support but only the first guide rail support and lift the container conveyed according to a certain vertical distance, the container is tilted. This is, despite of the surface of the container being slightly inclined causing a danger of moving an item from the container in case the container may not provide the friction needed to keep the item on it, still advantageous since for the purpose of weighing, only the first guide rail is required to arranged a proper weighing system.

In an embodiment, the weighing system further comprises a setting-down device arranged adjacent to the weighing device, the setting-down device comprising a frame, the frame comprising a setting-down area configured, when the container is being conveyed by the conveyor means, for receiving the container in the second vertical position from the weighing device and; guiding said container from the second vertical position towards the first vertical position. In this way, the container may be easily moved from the second vertical position to the first vertical position as being conveyed.

In an embodiment the container is provided with wheels for moving said container over the weighing device and lifting said container from the first vertical position to the second vertical position.

BRIEF DESCRIPTION OF THE DRAWINGS

For the purpose of illustrating the invention, the drawings show aspects of one or more embodiments of said invention. However, it should be understood that the present invention is not limited to the precise arrangements and instrumentalities shown in the drawings, wherein.

DETAILED DESCRIPTION OF THE DRAWINGS

It should be noted that items which have the same reference numbers in different figures, have the same structural features and the same functions. Where the function and/or structure of such item has been explained, there is no necessity for repeated explanation thereof in the detailed description.

It should be noted that the above-mentioned embodiments illustrate rather than limit the invention, and that those skilled in the art will be able to design many alternative embodiments.

Figure 1:
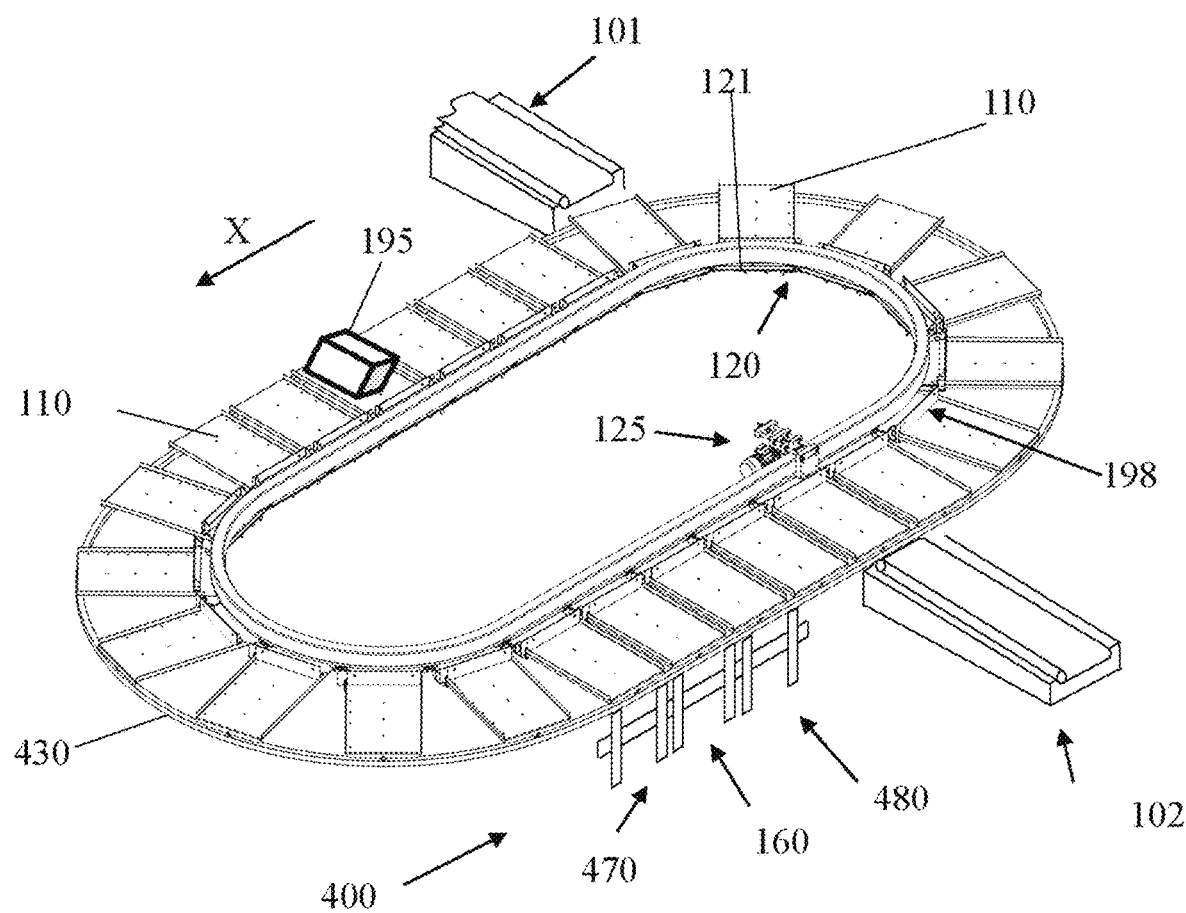
FIG. 1 is perspective view of an example of a weighing system arranged in a sorting device.

FIG. 1 shows a weighing system 400 according to the invention. In the example depicted in FIG. 1, the weighing system 400 comprises a plurality of containers 110, the present example a tray 110, connected to a conveyor means 120. In the present example the conveyor means 120 comprises an array of concatenated conveyor bars 121 mutually hingedly connected to form an endless chain. The conveyor means also comprises an actuator 125 to power or drive the conveyor bars 120.

Each conveyor bar 121 is connected to a tray 110, such that the tray 110 connected to it is conveyed in an horizontal position in a conveying direction defining an axis X, as shown by an arrow in FIG. 1. For such purpose, in the present example, said trays 110 are also guided by a guide means 430 arranged in said weighing system 400. The tray 110 can be thus conveyed from a receiving section 101 to an outlet section 102 of the weighing system 400, and so does an item 195 being supported on top of a tray 110. In the present example, the item 195 may be pushed by a pushing organ 198 arranged on the tray 110 at the outlet section 102 depending on its weight, as will be explained below.

FIG. 1 also shows that the weighing system 400 comprises a weighing device 160 arranged under the path of the trays 110, a location of which is suitable for collecting data relating to the weight of the item 195 being transported by one tray 110.

Figure 2:
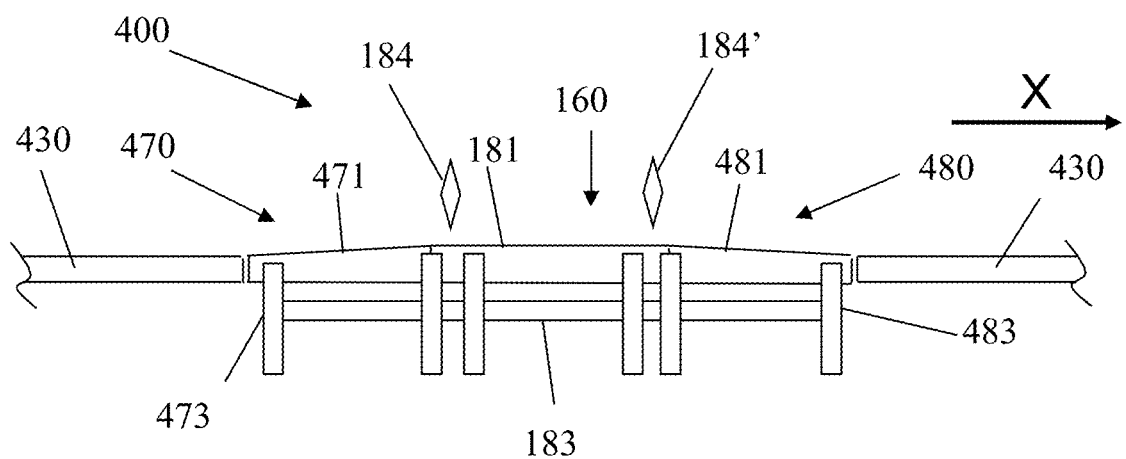
FIG. 2 is side view of an example of a weighing system of FIG. 1.

FIG. 2 shows a lateral side view of a section of the guiding means 430 before and after the weighing device 160. As depicted, the weighing device 160 forms a weighing area 181 supported by a frame 183. The weighing area 181 is arranged for weighing the items 195 supported on top of the trays 110. At both sides of the weighing area 181 two photoelectric cells 184 and 184' may be arranged to cooperate with the weighing device 160. In the present example, the weighing device 160 is also in communication with a processing unit (not shown) connected to an actuator (not shown).

Since the tray 110 is fixed to the conveyor bar when being conveyed in the first vertical position, said tray has to be moved upwardly from said fixed position to be weighed by the weighing device 160. This is achieved by the lifting device arranged upstream the weighing device 160 in the conveying direction. It comprises a receiving area 471 supported by a frame 473. In the conveying direction, the receiving area 471 defines a positive slope towards the weighing area 181, said receiving area 471 being thus adjacent to the weighing area 181.

Figure 3:
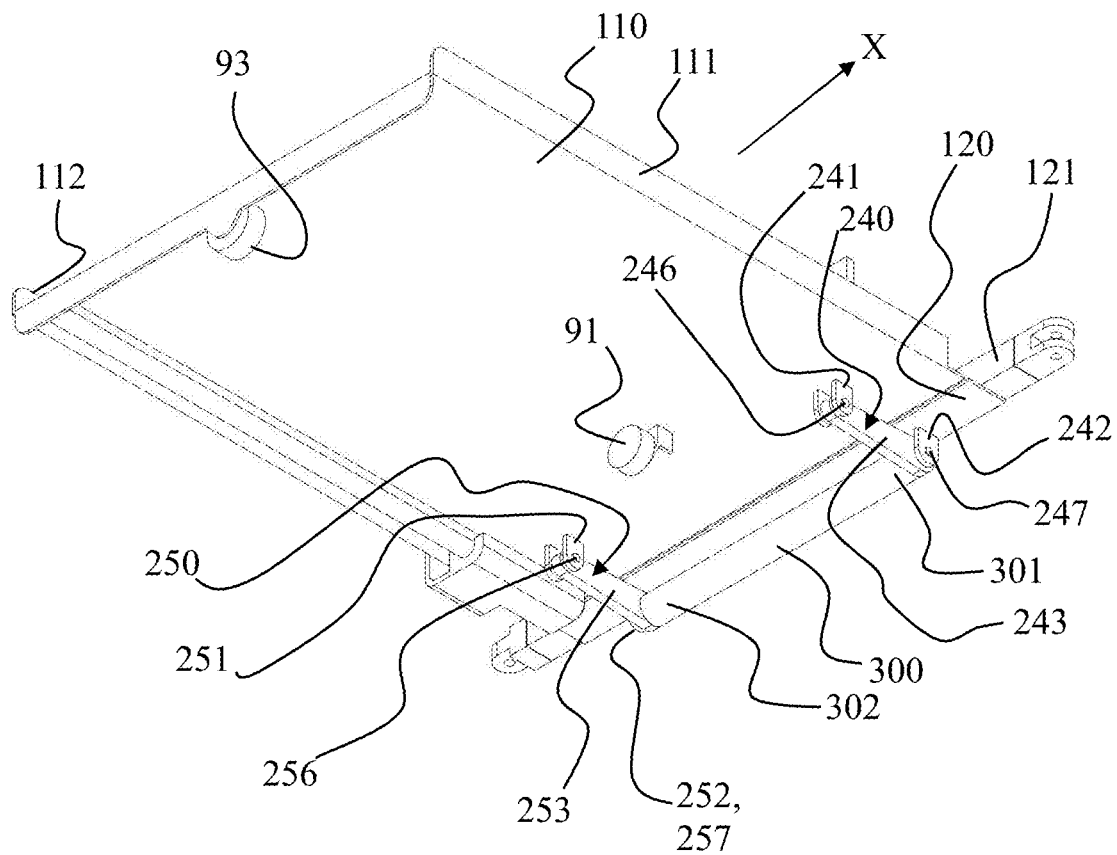
FIG. 3 is perspective view of a first example of a container used in the weighing system of FIG. 1 or 2.
Figure 4:
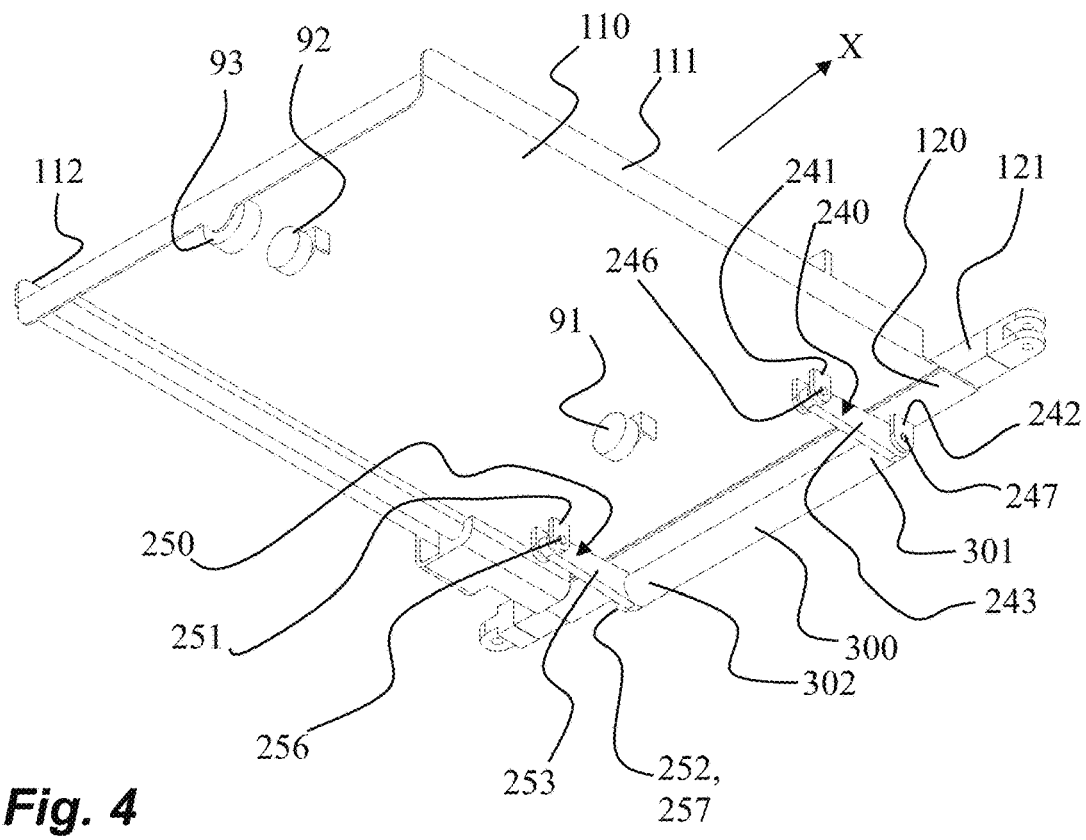
FIG. 4 is perspective view of a second example of a container used in the weighing system of FIG. 1 or 2.
Figure 5:
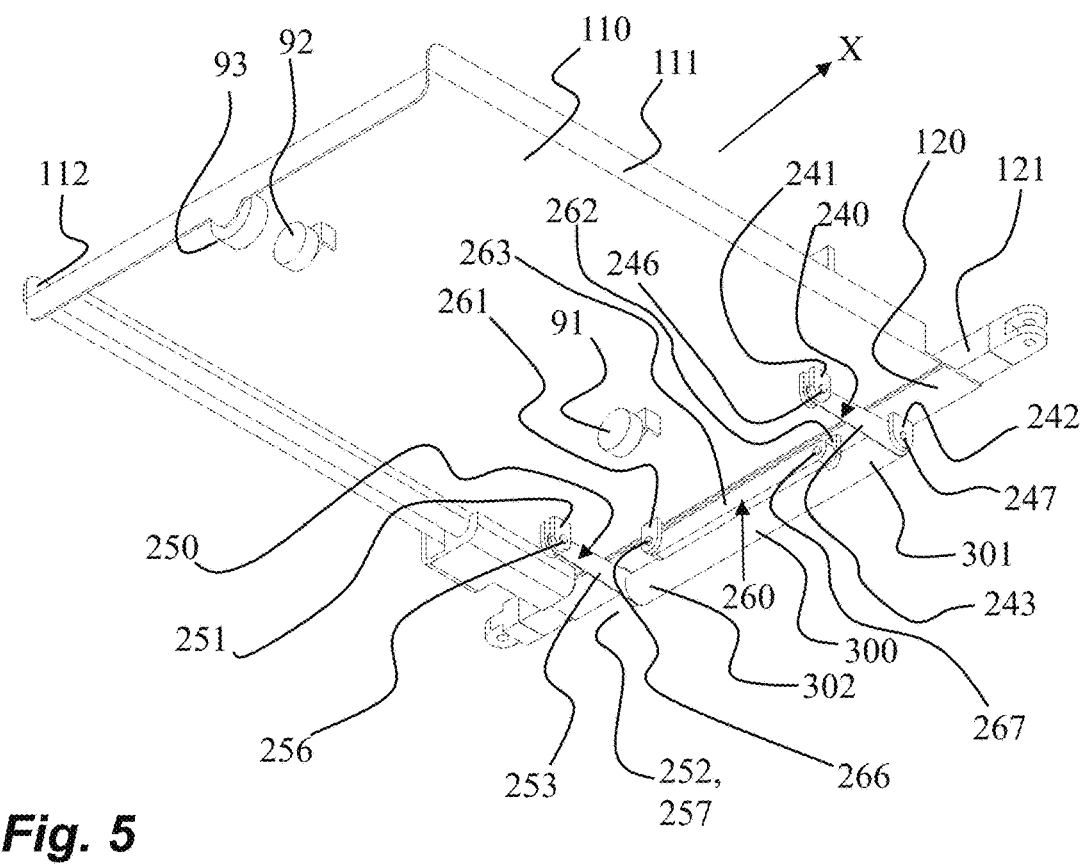
FIG. 5 is perspective view of a third example of a container used in the weighing system of FIG. 1 or 2.

The weighing device 400 comprises guide rails 41, 42, 43 arranged for receiving the wheels 91, 92, 93 of the tray 110 depicted in FIGS. 3-5 and for moving them upwardly such that said tray 110 is moved also upwardly with respect to the conveyor bar 121 to reach the unfixed position when being supported by the weighing area 181. In this way, the weight of the tray 110 supporting the item 195 is weighed by the weighing device 160 in the unfixed position, and the effect of the conveyor bar 121 on the load generated by the weight if said tray 110 and the item 195 on the weighing area 181 is negligible.

As depicted in FIGS. 1 and 2, the weighing system 400 also comprises a setting-down device 480 arranged downstream the weighing device 160 in the conveying direction. The setting-down device 480 comprises a frame 483 for supporting a setting-down area 481 arranged such that in the conveying direction X said setting-down area 481 defines a negative slope starting near the weighing area 181. As the tray 110 is being conveyed in the conveying direction, said tray 110 arrives at the setting-down device 480 from the weighing device 160. At this stage, rails 41, 42, 43 defining said setting-down area 481, guide the wheels 91, 92, 93 downwardly from the weighing device when said tray is being conveyed. Thus, a downward movement of the tray 110 with respect to the conveyor bar 121 is allowed due to gravity, said tray 110 reaching again the fixed position.

FIG. 3 shows a bottom side of the tray 110 relative to a conveyor bar 121 arranged in a conveyor chain of the conveyor means 120. In this view, an edge of the tray locating parallel to the conveyor bar 121 is resting on an extension of the conveyor bar 121. The conveyor bar 121 capable of moving along the conveying direction transfers, in such operation, a driving load on the tray 110 via a primary connection means 240 and a secondary connection means 250. In this example, the primary connecting means 240 may face a front side 111 of the container 110 when seen in the conveying direction and the secondary connecting means 250 may face a rear side 112 of the container 110 when seen in the conveying direction. A distance extends between the primary connecting means 240 and the secondary connecting means 250. The distance is preferably as large as possible to achieve a high accurate measurement of a weight of the tray including an item on top of it.

According to the invention, the tray 110 is connected to the conveyor means 120 via a primary connecting means 240 and a secondary connecting means 250. Each of the two connecting means comprises a first section 241, 251 permanently connected to the tray 110, a second section 242, 252 permanently connected to the conveyor means 120, and a third section 243, 253 hingedly connected to both the first section 241, 251 and the second section 242, 252.

The primary third section 243 comprises a primary first pin 246 arranged within a primary first opening of the primary first section 241. The cooperation of the primary first pin 246 and the primary first opening allows for hingedly connection of said primary third section 243 with the primary first section 241. Similarly, said primary third section 243 is hingedly connected to the primary second section via a primary second pin 247 of said primary third section 243 and arranged within a primary second opening of said primary second section 242.

The secondary third section 253 also comprises a secondary first pin 256 and a secondary second pin 257. In this way, the secondary third section 253 is hingedly connected to the secondary first section 251 via a secondary first opening arranged in said secondary first section 251 and to the secondary second section 252 via a secondary second opening arranged in said secondary second section 252.

Both connecting means 240, 250 are arranged such that the third section 243 of the primary connecting means 240 and the third section 253 of the secondary connecting means 250 are rotatable about a first axis substantially parallel to the conveying direction. The rotation of said third sections 243, 253 about the first axis allows for movement of the tray 110 with respect to the conveyor means 120 in a vertical direction from the first vertical position to a second vertical position. According to the invention, the third section 243 of the primary connecting means 240 and the third section 253 of the secondary connecting means 250 are mutually coupled by means of a coupling element 300 arranged to interconnect the third section 243 of the primary connecting means 240 and the third section 253 of the secondary connecting means 250. The coupling element 300 is in this example a construction element which is torsionally rigid along an axis extending parallel to the conveying direction. This helps to reduce tilting of the container 110 (tray), thus improving the measurement. The coupling element 300 may be an elongated construction element such as a bar or a pipe. The coupling element 300 is having a first end 301 pointing forward in the conveying direction and a second end 302 pointing backward in the conveying direction. The first end 301 of the coupling element 300 is permanently connected to the third section 243 of the primary connecting means 240 and the second end 302 of the coupling element 300 is permanently connected to the third section 253 of the secondary connecting means 250 so as the coupling element 300 to extend between the identical linkages 240, 250 and to span the distance between the third sections 243, 253. Preferably, the first end 301 of the coupling element 300 is welded to the third section 243 of the primary connecting means 240 and the second end 302 of the coupling element 300 is welded to the third section 253 of the secondary connecting means 250.

The tray 110 according to FIG. 3 is equipped with wheels such a first roller 91 fixed to the bottom of the container 110 at a position between the primary connecting means 240 and the secondary connecting means 250, preferably in the middle between the front side 111 of the container 110 when seen in the conveying direction and the rear side 112 of the container 110 when seen in the conveying direction. A third roller 93 is arranged at a side of the container 110 opposing the conveyor means 120, or, in other words, at a side of the tray 110 where the item to be conveyed leaves the tray 110 when it is being pushed away by the pushing organ 198. The third roller 93 is capable of running over a rail 43 or guiding means 430. Both the first and the third roller are preferably having the same diameter dimensions and have shafts of rotation which are collinear.

Figure 6:
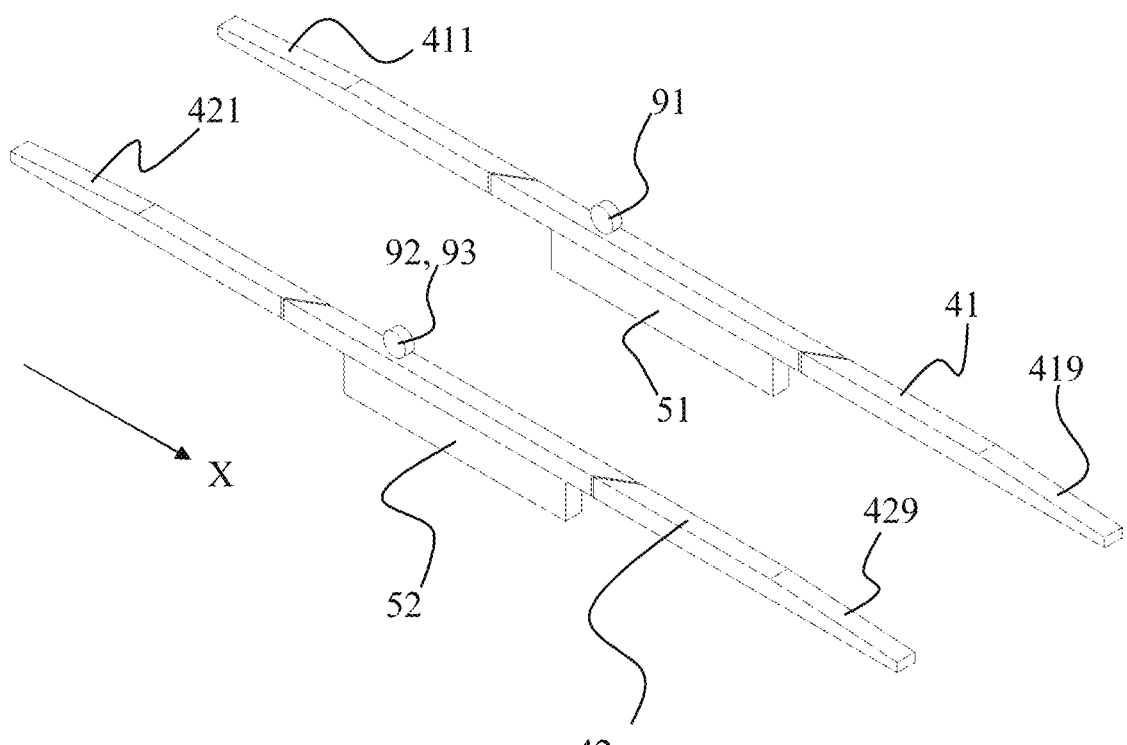
FIG. 6 is perspective view of a first example of the guide rail setting in the weighing system of FIG. 1 or 2.

The tray 110 according to FIG. 3 is capable of running over the weighing system 400 wherein the weighing area is equipped with a first guide rail 41 and a second guide rail 42 according to FIG. 6 so as to move the tray 110 between the first vertical position and the second vertical position according to a lifting or translation along the axis Z of the entire tray 110. The first and second guide rail 41, 42 are each having a slightly inclined positive slope 411, 421 in the receiving area 471 of the weighing system 400 and a slightly inclined negative slope 419,429 in the setting-down area 481 of the weighing system 400.

Figure 7:
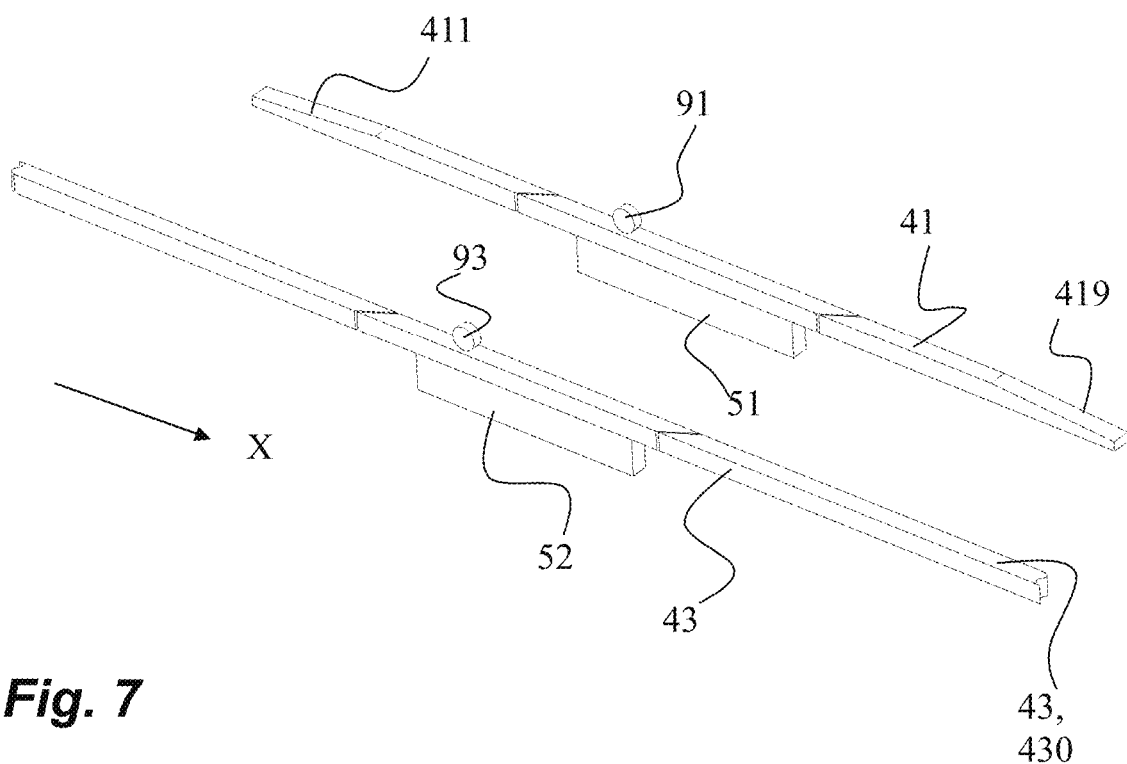
FIG. 7 is perspective view of a second example of the guide rail setting in the weighing system of FIG. 1 or 2.

The tray 110 according to FIG. 3 is capable of running over the weighing system 400 wherein the weighing area is equipped with a first guide rail 41 and a third guide rail 43 according to FIG. 7 so as to move the tray 110 between the first vertical position and the second vertical position according to a tilting along the axis X. The first guide rail 41 is having a slightly inclined positive slope 411 in the receiving area 471 of the weighing system 400 and a slightly inclined negative slope 419 in the setting-down area 481 of the weighing system 400. The third guide rail 430 does not have inclined positive or negative slopes at all and forms a one-off flat area to guide the third guide roller 93 of the tray 110 depicted in FIG. 3.

FIG. 4 shows a bottom side of the tray 110 relative to a conveyor bar 121 arranged in a conveyor chain of the conveyor means 120 as well. Compared with the tray 110 depicted in FIG. 3, the tray 110 according to FIG. 4 is equipped with a second roller 92 fixed to the bottom of the container 110, collinear with and between the first and the third roller 91, 93, however locating very near to the third roller 93.

Figure 8:
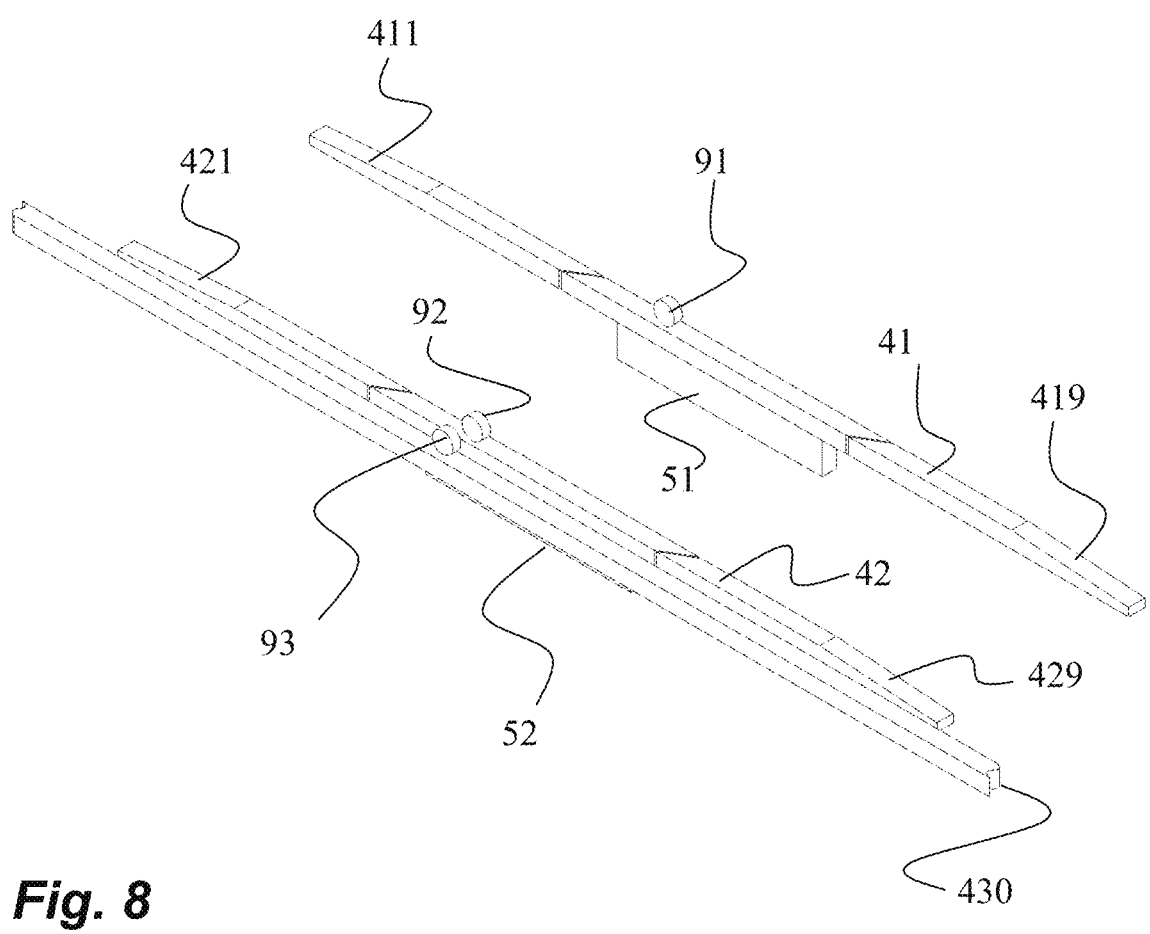
FIG. 8 is perspective view of a third example of the guide rail setting in the weighing system of FIG. 1 or 2.

The tray 110 according to FIG. 4 is capable of running over the weighing system 400 wherein the weighing area is equipped with a first guide rail 41, a second guide rail 42, and a third guide rail 430 according to FIG. 8 so as to move the tray 110 between the first vertical position and the second vertical position according to a lifting or translation along the axis Z of the entire tray 110. The first and second guide rail 41, 42 are each having a slightly inclined positive slope 411, 421 in the receiving area 471 of the weighing system 400 and a slightly inclined negative slope 419,429 in the setting-down area 481 of the weighing system 400. In this example, the third roller 93 of the tray 110 is, when it is in the second vertical position, moving over the third guide rail 430 without contacting it. To this end, the load of the tray 110 including the item can be measured by means of load cells 51, 52 supporting the tray 110 conveyed.

Also the tray 110 according to FIG. 5 is capable of running over the weighing system 400 similar like the tray 110 depicted in FIG. 4. A skilled man will understood however, that the tray 110 according to FIG. 5 wherein the second roller would be omitted, is capable of running over the weighing system 400 similar like the tray 110 depicted in FIG. 3.

The tray 110 according to FIG. 5 is basically similar to the tray 110 depicted in FIG. 4 but differs therewith in that the third section 243 of the primary connecting means 240 as well as the third section 253 of the secondary connecting means 250 are, seen in conveying direction, flexible so as to allow deformation along an axis parallel to the conveyance direction. I.e. both the primary connecting means 240 as well as the secondary connecting means 250 are unable to transfer a driving force from the conveyor means 120 without deformation of the third sections so that a load measured is influenced by interference. To transfer a driving force from the conveyor means 120, a tertiary connecting means 260 is arranged comprising a first section 261 permanently connected to the tray 110, a second section 262 permanently connected to the conveyor means 120, and a third section 263 hingedly connected to both the first section 261 and the second section 262 of the tertiary connecting means 260.

The tertiary third section 263 comprises a tertiary first pin 266 arranged within a tertiary first opening of the tertiary first section 261. The cooperation of the tertiary first pin 266 and the tertiary first opening allows for hingedly connection of said tertiary third section 263 with the tertiary first section 261. Similarly, said tertiary third section 263 is hingedly connected to the tertiary second section 262 via a tertiary second pin 267 of said tertiary third section 263 and arranged within a tertiary second opening of said tertiary second section 262.

The tertiary connecting means 260 is arranged such that the third section 263 of the tertiary connecting means 260 is rotatable about a second axis transverse to the conveying direction such that the rotation of said third section 263 about the second axis allows for movement of the tray 110 with respect to the conveyor means 120 in a vertical direction from the first vertical position to a second vertical position.

All in all, the weighing system 400 according to the invention achieves a high accuracy measurement of the weight of the tray 110 including the item supported by the tray 110. The weighing system 400 allows measurement of the weight during conveyance. In case only the first guide rail 41 has a slightly inclined positive slope 411 in the receiving area 471 of the weighing system 400 and a slightly inclined negative slope 419 in the setting-down area 481 of the weighing system 400, the tray 110 is slightly tilted about the axis along the conveying direction, resulting is a small angled position of the item. In case the first and the second guide rail 41, 42 have a slightly inclined positive slope 411, 421 in the receiving area 471 of the weighing system 400 and a slightly inclined negative slope 419,429 in the setting-down area 481 of the weighing system 400, the tray 110 remains level or flush with the horizontal, so that the position of the item is not affected at all.

The invention claimed is:

1. A weighing system for weighing an item when being conveyed from a receiving section to an outlet section, the weighing system comprising:
at least one container for transporting the item;
a conveyor means connected to the container for conveying said container in a conveying direction at a first vertical position relative to the conveyor means; and
a weighing device for weighing the container with the item when said container is being conveyed and supported on said weighing device;
wherein the container is connected to the conveyor means via a primary connecting means and a secondary connecting means, each of the two connecting means comprising a first section permanently connected to the container, a second section permanently connected to the conveyor means, and a third section hingedly connected to both the first section and the second section;
wherein both connecting means are arranged such that the third section of the primary connecting means and the third section of the secondary connecting means are rotatable about a first axis substantially parallel to the conveying direction, such that the rotation of said third sections about the first axis allows for movement of the container with respect to the conveyor means in a vertical direction from the first vertical position to a second vertical position where the container with the item can be weighed by the weighing device, and
wherein the third section of the primary connecting means and the third section of the secondary connecting means are mutually coupled.

2. The weighing system according to claim 1, wherein the primary connecting means and the secondary connecting means form identical linkages which are spaced apart at a distance so as to fit to the container between the front side and the rear side thereof when considering the conveying direction.

3. The weighing system according to claim 1, wherein a coupling element is arranged to interconnect the third section of the primary connecting means and the third section of the secondary connecting means.

4. The weighing system according to claim 3, wherein the coupling element is a construction element which is torsionally rigid along an axis extending parallel to the conveying direction.

5. The weighing system according to claim 3, wherein the coupling element is an elongated construction element.

6. The weighing system according to claim 3, wherein the primary connecting means and the secondary connecting means form identical linkages, wherein the coupling element has a first end pointing forward in the conveying direction and a second end pointing backward in the conveying direction, the first end of which is permanently connected to the third section of the primary connecting means and the second end of which is permanently connected to the third section of the secondary connecting means, such that the coupling element extends between the identical linkages and spans the distance between the third sections.

7. The weighing system according to claim 6, wherein the first end of the coupling element is welded to the third section of the primary connecting means and the second end of the coupling element is welded to the third section of the secondary connecting means.

8. The weighing system according to claim 1, wherein the third section of the first connecting means is in a parallelepiped arrangement with respect to the third section of the secondary connecting means.

9. The weighing system according to claim 1, wherein the third section of the primary connecting means as well as the third section of the secondary connecting means are designed to allow a movement of the container between the first vertical position and the second vertical position and to transmit actuation of the conveyor means to the container in the conveying direction.

10. The weighing system according to claim 1, wherein a lifting device is arranged comprising a frame, the frame comprising a receiving area adjacent to the weighing device, said receiving area configured, when the container is being conveyed, for iii) receiving the container in the first vertical position and; iv) guiding the container upwardly towards the second vertical position by means of a first guide rail to be impinged by a first roller fixed to the bottom of the container at a position between the primary connecting means and the secondary connecting means.

11. The weighing system according to claim 10, wherein the receiving area is further configured, when the container is being conveyed for guiding the container for upward translation towards the second vertical position by means of a second guide rail to be impinged by a second roller fixed to the bottom of the container at a position facing away the conveyor means, preferably in the middle between the front side of the container when seen in the conveying direction and the rear side of the container when seen in the conveying direction.

12. The weighing system according to claim 10, wherein the receiving area is further configured, when the container is being conveyed for guiding the container for upward tilting along an axis parallel to the conveying direction, wherein tilting is caused by means of a third guide rail which is flush and aligned with a rail before the container entered the receiving area, the third guide rail to be followed by a third roller fixed to the bottom of the container at a position facing away the conveyor means, preferably in the middle between the front side of the container when seen in the conveying direction and the rear side of the container when seen in the conveying direction.

13. The weighing system according to claim 10, wherein the weighing system further comprises a setting-down device arranged adjacent to the weighing device, the setting-down device comprising a frame, the frame comprising a setting-down area configured, when the container is being conveyed by the conveyor means, for
i) receiving the container in the second vertical position from the weighing device and;
ii) guiding said container from the second vertical position towards the first vertical position.

14. The weighing system according to claim 1, wherein the container is a tray, and wherein the movement from the first vertical position to the second vertical position is a translation along a vertical axis of the entire tray.

15. A weighing system for weighing an item when being conveyed from a receiving section to an outlet section, the weighing system comprising:

at least one container for transporting the item;

a conveyor means connected to the container for conveying said container in a conveying direction at a first vertical position relative to the conveyor means; and a weighing device for weighing the container when said container is being conveyed and supported on said weighing device;

wherein the container is connected to the conveyor means via a primary connecting means and a secondary connecting means, each of the two connecting means comprising a first section permanently connected to the container, a second section permanently connected to the conveyor means, and a third section hingedly connected to both the first section and the second section;

wherein both connecting means are arranged such that the third section of the primary connecting means and the third section of the secondary connecting means are rotatable about a first axis substantially parallel to the conveying direction, such that the rotation of said third sections about the first axis allows for movement of the container with respect to the conveyor means in a vertical direction from the first vertical position to a second vertical position, and wherein the third section of the primary connecting means and the third section of the secondary connecting means are mutually coupled;

wherein the container is, in addition, connected to the conveyor means via a tertiary connecting means comprising a first section permanently connected to the container, a second section permanently connected to the conveyor means, and a third section hingedly connected to both the first section and the second section of the tertiary connecting means; wherein the tertiary connecting means is arranged such that the third section of the tertiary connecting means is rotatable about a second axis transverse to the conveying direction such that the rotation of said third section about the second axis allows for movement of the container with respect to the conveyor means in a vertical direction from the first vertical position to a second vertical position.

16. The weighing system according to claim 15, wherein the third section of the primary connecting means as well as the third section of the secondary connecting means are, seen in conveying direction, flexible so as to allow deformation along an axis parallel to the conveyance direction.

17. A weighing system for weighing an item when being conveyed from a receiving section to an outlet section, the weighing system comprising:

at least one container for transporting the item;

a conveyor means connected to the container for conveying said container in a conveying direction at a first vertical position relative to the conveyor means; and a weighing device for weighing the container when said container is being conveyed and supported on said weighing device;

wherein the container is connected to the conveyor means via a primary connecting means and a secondary connecting means, each of the two connecting means comprising a first section permanently connected to the container, a second section permanently connected to the conveyor means, and a third section hingedly connected to both the first section and the second section;

wherein both connecting means are arranged such that the third section of the primary connecting means and the third section of the secondary connecting means are rotatable about a first axis substantially parallel to the conveying direction, such that the rotation of said third sections about the first axis allows for movement of the container with respect to the conveyor means in a vertical direction from the first vertical position to a second vertical position, and wherein the third section of the primary connecting means and the third section of the secondary connecting means are mutually coupled;

wherein the container is provided with wheels for moving said container over the weighing device and lifting said container from the first vertical position to the second vertical position.

\* \* \* \* \*